(12) United States Patent
Abinader, Jr. et al.

(10) Patent No.: US 9,578,536 B2
(45) Date of Patent: Feb. 21, 2017

(54) PERFORMING MEASUREMENTS IN WIRELESS NETWORK

(71) Applicant: Nokia Technologies Oy, Espoo (FI)

(72) Inventors: Fuad Mousse Abinader, Jr., Manaus (BR); Fabiano Chaves, Manaus (BR); Erika Portela Lopes De Almeida, Manaus (BR); Andre Mendes Cavalcante, Manaus (BR); Robson Domingos Vieira, Brasilia (BR); Sayantan Choudhury, Berkeley, CA (US); Klaus Franz Doppler, Albany, CA (US); Mika Ilkka Tapani Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/902,914

(22) PCT Filed: Jul. 5, 2013

(86) PCT No.: PCT/US2013/049429
§ 371 (c)(1),
(2) Date: Jan. 5, 2016

(87) PCT Pub. No.: WO2015/002656
PCT Pub. Date: Jan. 8, 2015

(65) Prior Publication Data
US 2016/0150434 A1 May 26, 2016

(51) Int. Cl.
*H04B 17/00* (2015.01)
*H04W 24/10* (2009.01)
(Continued)

(52) U.S. Cl.
CPC ............... *H04W 24/10* (2013.01); *H04W 4/00* (2013.01); *H04W 4/06* (2013.01); *H04W 4/08* (2013.01);
(Continued)

(58) Field of Classification Search
None
See application file for complete search history.

(56) References Cited

U.S. PATENT DOCUMENTS 6,434,364 B1 * 8/2002 O'Riordain ........... H04W 24/00
455/419
7,043,237 B2 * 5/2006 Snyder ................ H04L 41/0816
455/418
(Continued)

FOREIGN PATENT DOCUMENTS

EP 2559288 A1 2/2013

OTHER PUBLICATIONS

International Search Report of PCT/US2013/049429, dated Sep. 17, 2013.
(Continued)

*Primary Examiner* — Tuan A Tran
(74) *Attorney, Agent, or Firm* — Banner & Witcoff, Ltd.

(57) ABSTRACT

Methods, apparatuses, and computer programs for assigning measurement groups in a wireless network are disclosed. The measurement group may be announced by measurement group information comprised in a broadcast message transmitted in the wireless network. Reporting may be triggered by transmission of a request-to-report message transmitted in the wireless network.

12 Claims, 5 Drawing Sheets

(51) Int. Cl.
*H04W 4/00* (2009.01)
*H04W 52/02* (2009.01)
*H04W 4/06* (2009.01)
*H04W 4/08* (2009.01)
*H04W 74/08* (2009.01)

(52) U.S. Cl.
CPC ..... *H04W 52/0216* (2013.01); *H04W 52/0219* (2013.01); *H04W 74/08* (2013.01)

(56) References Cited

U.S. PATENT DOCUMENTS

| | | | |
|---|---|---|---|
| 8,102,818 B2 * | 1/2012 | Fang | H04W 48/16 370/332 |
| 8,577,386 B2 * | 11/2013 | Gao | H04W 24/10 455/436 |
| 8,738,011 B2 * | 5/2014 | Jeong | H04W 36/0094 455/434 |
| 2004/0114560 A1 | 6/2004 | Jacobsen | |
| 2008/0165727 A1 | 7/2008 | Xiaoben et al. | |
| 2012/0020226 A1 | 1/2012 | Trainin | |
| 2012/0040696 A1 | 2/2012 | Siomina et al. | |
| 2012/0170457 A1 | 7/2012 | Zdarsky et al. | |
| 2012/0236731 A1 | 9/2012 | Beaudin | |
| 2013/0121187 A1 | 5/2013 | Das et al. | |

OTHER PUBLICATIONS

Supplementary European Search Report of PCT/US2013049429, dated Dec. 9, 2016.
Gong, Michelle X. "Directional CSMA/CA protocol with spatial reuse for mmWave wireless networks", Dec. 6, 2010, pp. 1-6.

* cited by examiner

PERFORMING MEASUREMENTS IN WIRELESS NETWORK

FIELD

The invention relates to the field of wireless networks and, particularly, to configuring and carrying out measurements in a wireless network.

BACKGROUND

Wireless apparatuses of a wireless network may perform channel measurements for various purposes, e.g. in order to detect other wireless networks or to test channel conditions between two wireless apparatuses of the same wireless network.

BRIEF DESCRIPTION

The invention is defined by the independent claims.

Embodiments of the invention are defined in the dependent claims.

According to an aspect, there is provided a method comprising: acquiring, in a first apparatus, a broadcast message from a second apparatus, the broadcast message comprising measurement group information specifying a subset of apparatuses of a wireless network, the subset comprising more than one apparatus and forming a measurement group; determining, by the first apparatus, whether or not the first apparatus is specified in the measurement group information; acquiring, in the first apparatus, a request-to-report message from the second apparatus; and in response to determining that the first apparatus is specified in the measurement group information and said acquiring the request-to-report message, causing transmission of a measurement report to the second apparatus.

In an embodiment, the broadcast message comprises an information element specifying a measurement type for the measurement group. In an embodiment, the measurement type comprises measurements of signals received from another wireless network.

In an embodiment, the measurement group information comprises a measurement group identifier assigned to the measurement group and the request-to-report message comprises the measurement group identifier.

In an embodiment, the broadcast message comprises at least second measurement group information specifying a second subset of apparatuses of a wireless network forming a second measurement group.

In an embodiment, the method further comprises in the first apparatus: determining that the first apparatus is specified in at least two measurement group information.

In an embodiment, the method further comprises in the first apparatus: in response to determining that the first apparatus is not specified in the measurement group information and said acquiring the request-to-report message, preventing transmission of any frame in the wireless network for a determined duration after acquiring the request-to-report message.

In an embodiment, the request-to-report message comprises scheduling information scheduling transmission time slots to the subset of apparatuses specified by the measurement group information, the method further comprising in the first apparatus: in response to said determining that the first apparatus is specified in the measurement group information and said acquiring the request-to-report message, determining a time slot scheduled to the first apparatus from the scheduling information comprised in the acquired request-to-report message and causing the transmission of the measurement report in the determined time slot.

In an embodiment, the request-to-report message is at least one of a unicast message and a broadcast null data packet clear-to-send message.

In an embodiment, the method further comprises: acquiring a request-to-report message from a third apparatus belonging to a second wireless network different from the wireless network of the first apparatus; and in response to said acquiring the request-to-report message from the third apparatus, preventing transmission of any frame in the wireless network of the first apparatus for a determined duration after acquiring the request-to-report message from the third apparatus.

According to another aspect, there is provided a method comprising: selecting, by a first apparatus, a measurement group amongst apparatuses of a wireless network, wherein the measurement group comprises a subset of more than one apparatus of the wireless network; causing, in a first apparatus, transmission of a broadcast message in the wireless network, the broadcast message comprising measurement group information specifying the selected subset of apparatuses; causing, by the first apparatus, transmission of a request-to-report message in the wireless network; and acquiring a plurality of measurement report from the selected subset of apparatuses as a response to the transmitted request-to-report message.

In an embodiment, the broadcast message comprises an information element specifying a measurement type for the measurement group. In an embodiment, the measurement type comprises measurements of signals received from another wireless network.

In an embodiment, the method further comprises in the first apparatus: selecting a second measurement group amongst the apparatuses of the wireless network, wherein the second measurement group comprises a different subset of apparatuses of the wireless network; and inserting second measurement group information specifying the second subset of apparatuses into the broadcast message.

In an embodiment, the method further comprises in the first apparatus: dedicating a bit in the measurement group information for each apparatus of the wireless network; and indicating by the value of a bit dedicated to each apparatus whether or not the apparatus belongs to the measurement group.

In an embodiment, the method further comprises in the first apparatus: allocating transmission time slots to the selected subset of apparatuses; inserting scheduling information indicating the allocated transmission time slots into the request-to-report message; and acquiring the measurement reports from the subset of apparatuses in the allocated transmission time slots.

In an embodiment, the method further comprises in the first apparatus: acquiring a request-to-report message from a second apparatus belonging to a second wireless network different from the wireless network of the first apparatus; and in response to said acquiring the request-to-report message from the second apparatus, preventing transmission of any frame in the wireless network of the first apparatus for a determined duration after acquiring the request-to-report message from the second apparatus.

In an embodiment, wherein the measurement group information comprises a measurement group identifier and the request-to-report message comprises the measurement group identifier.

According to another aspect, there is provided an apparatus comprising: at least one processor; and at least one memory including a computer program code, wherein the at least one memory and the computer program code are configured, with the at least one processor, to cause the apparatus to: acquire a broadcast message from a second apparatus, the broadcast message comprising measurement group information specifying a subset of apparatuses of a wireless network, the subset comprising more than one apparatus and forming a measurement group; determine whether or not the apparatus is specified in the measurement group information; acquire a request-to-report message from the second apparatus; and in response to determining that the apparatus is specified in the measurement group information and said acquiring the request-to-report message, cause transmission of a measurement report to the second apparatus.

In an embodiment, the broadcast message comprises an information element specifying a measurement type for the measurement group. In an embodiment, the measurement type comprises measurements of signals received from another wireless network.

In an embodiment, the measurement group information comprises a measurement group identifier assigned to the measurement group and the request-to-report message comprises the measurement group identifier.

In an embodiment, the broadcast message comprises at least second measurement group information specifying a second subset of apparatuses of a wireless network forming a second measurement group.

In an embodiment, the at least one memory and the computer program code are configured, with the at least one processor, to cause the apparatus to determine that the apparatus is specified in at least two measurement group information.

In an embodiment, the at least one memory and the computer program code are configured, with the at least one processor, to cause the apparatus to: in response to determining that the apparatus is not specified in the measurement group information and said acquiring the request-to-report message, prevent transmission of any frame in the wireless network for a determined duration after acquiring the request-to-report message.

In an embodiment, the request-to-report message comprises scheduling information scheduling transmission time slots to the subset of apparatuses specified by the measurement group information, and wherein the at least one memory and the computer program code are configured, with the at least one processor, to cause the apparatus to: in response to said determining that the first apparatus is specified in the measurement group information and said acquiring the request-to-report message, determine a time slot scheduled to the apparatus from the scheduling information comprised in the acquired request-to-report message and cause the transmission of the measurement report in the determined time slot.

In an embodiment, the request-to-report message is at least one of a unicast message and a broadcast null data packet clear-to-send message.

In an embodiment, the at least one memory and the computer program code are configured, with the at least one processor, to cause the apparatus to: acquire a request-to-report message from a third apparatus belonging to a second wireless network different from the wireless network of the apparatus; and in response to said acquiring the request-to-report message from the third apparatus, prevent transmission of any frame in the wireless network of the apparatus for a determined duration after acquiring the request-to-report message from the third apparatus.

According to another aspect, there is provided an apparatus comprising: at least one processor; and at least one memory including a computer program code, wherein the at least one memory and the computer program code are configured, with the at least one processor, to cause the apparatus to: select a measurement group amongst apparatuses of a wireless network, wherein the measurement group comprises a subset of more than one apparatus of the wireless network; cause transmission of a broadcast message in the wireless network, the broadcast message comprising measurement group information specifying the selected subset of apparatuses; cause transmission of a request-to-report message in the wireless network; and acquire a plurality of measurement report from the selected subset of apparatuses as a response to the transmitted request-to-report message.

In an embodiment, the broadcast message comprises an information element specifying a measurement type for the measurement group. In an embodiment, the measurement type comprises measurements of signals received from another wireless network.

In an embodiment, the at least one memory and the computer program code are configured, with the at least one processor, to cause the apparatus to: select a second measurement group amongst the apparatuses of the wireless network, wherein the second measurement group comprises a different subset of apparatuses of the wireless network; and insert second measurement group information specifying the second subset of apparatuses into the broadcast message.

In an embodiment, the at least one memory and the computer program code are configured, with the at least one processor, to cause the apparatus to: dedicate a bit in the measurement group information for each apparatus of the wireless network; and indicate by the value of a bit dedicated to each apparatus whether or not the apparatus belongs to the measurement group.

In an embodiment, the at least one memory and the computer program code are configured, with the at least one processor, to cause the apparatus to: allocate transmission time slots to the selected subset of apparatuses; insert scheduling information indicating the allocated transmission time slots into the request-to-report message; and acquire the measurement reports from the subset of apparatuses in the allocated transmission time slots.

In an embodiment, the at least one memory and the computer program code are configured, with the at least one processor, to cause the apparatus to: acquire a request-to-report message from a second apparatus belonging to a second wireless network different from the wireless network of the apparatus; and in response to said acquiring the request-to-report message from the second apparatus, prevent transmission of any frame in the wireless network of the apparatus for a determined duration after acquiring the request-to-report message from the second apparatus.

In an embodiment, the measurement group information comprises a measurement group identifier and the request-to-report message comprises the measurement group identifier.

In an embodiment, the apparatus further comprises radio interface components configured to provide the apparatus with radio communication capability.

LIST OF DRAWINGS

Embodiments of the present invention are described below, by way of example only, with reference to the accompanying drawings, in which FIG. 1 illustrates a wireless communication scenario to which embodiment of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
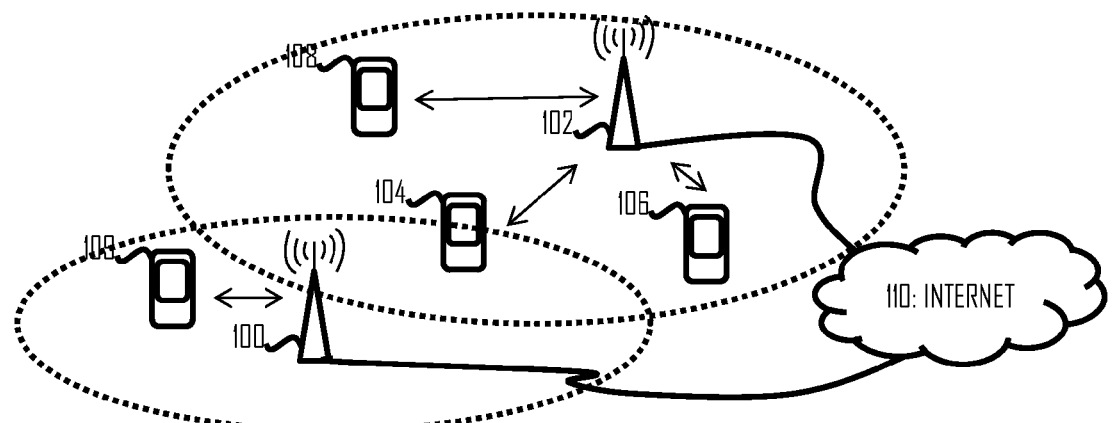

A general wireless communication scenario to which embodiments of the invention may be applied is illustrated in FIG. 1. FIG. 1 illustrates wireless communication devices comprising access points (AP) 100, 102 and a plurality of terminal devices (STA) 104, 106, 108, 109. The AP 100, 102 may be a stationary access point or a mobile access point. A general term used in this specification and encompassing both the APs and STAs is a wireless apparatus. The access point may refer to an access point specified in IEEE 802.11 specifications or to a base station of another wireless access network. At least one of the terminal devices 104 to 109 may have a functionality of an AP as well. Therefore, a common term encompassing both the stationary APs 100 and mobile APs is an access node. An access node may provide or be comprised in a basic service set (BSS) which is a basic building block of an IEEE 802.11 wireless local area network (WLAN). Each access node may represent a different BSS. The most common BSS type is an infrastructure BSS that includes a single access node together with all STAs associated with the access node. The access node may provide access to other networks, e.g. the Internet 110. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to may systems as well.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless apparatuses of the wireless network may carry out channel contention. The access node may define the RAW and a group of wireless apparatuses that are allowed to attempt the channel access within the RAW. Grouping allows partitioning of the wireless apparatuses into groups and restricting channel access only to wireless apparatuses belonging to a specified group at any given time period. The time period may be enabled by allocating slot duration and a number of slots in RAW access. The grouping may help to reduce contention by restricting access to the medium only to a subset of the wireless apparatuses. The grouping may also reduce the signalling overhead.

As described above, the BSS may be represented by the access node and one or more terminal devices connected to the access node. A terminal device may establish a connection with any one of the access nodes it has detected to provide a wireless connection within the neighbourhood of the terminal device. In the example of FIG. 1, terminal devices 106, 108 are located within the coverage area of the access node 102 so they may establish a connection to that access node 102. Similarly, the terminal device 109 may establish a connection to the access node 100. The terminal device 104 is located in an area where the coverage areas represented by the dotted circles overlap and, thus, the terminal device 104 may establish a connection to either access node 100, 102. Now, let us assume that the terminal device 104 connects to the access node 102. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

Terminal devices may be configured to carry out measurements in order to detect new access nodes and/or to measure overlapping wireless networks and their wireless apparatuses. The measurements may be carried out with a purpose of making an association to a new access node or reporting the presence or parameters of neighbouring wireless networks to an access node currently associated to the terminal device. The terminal device may carry out the measurements by scanning for signals transmitted by wireless apparatuses of other wireless networks, e.g. wireless apparatuses that do not belong to the wireless network of the terminal device. Upon detecting a signal transmitted by such a wireless apparatus, the terminal device may report the detected wireless apparatus to the associated access node.

Figures 2A, 2B:
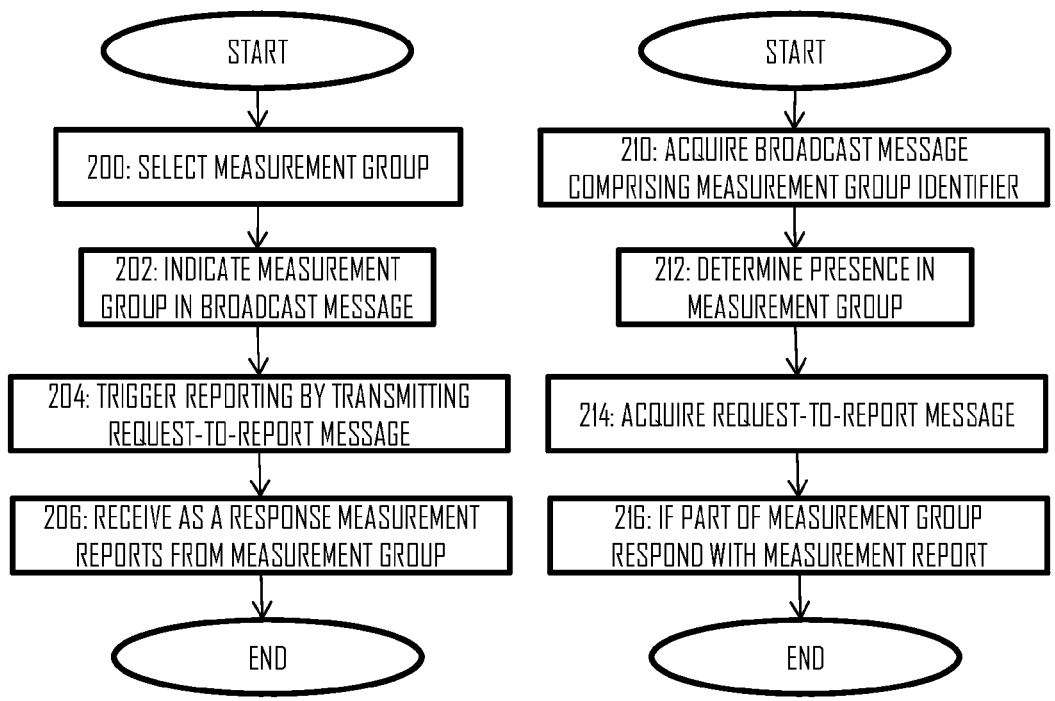
FIGS. 2A and 2B illustrate flow diagrams of processes for performing measurements in a wireless network according to some embodiments of the invention.

FIGS. 2A and 2B illustrate flow diagrams of an embodiment where the access node selects a subset of apparatuses of its wireless network to a measurement group and collectively controls the measurement group to report measurement results to the access node. Referring to FIG. 2A illustrating this procedure in the access node, the access node selects a measurement group amongst apparatuses of a wireless network in block 200. The measurement group comprises a subset of more than one apparatus of the wireless network. In other words, the access node may select more than one apparatus but less than all apparatuses of the wireless network. Referring to the wireless network of the access node 102 in FIG. 1, the access node 102 may select more than one but less than three terminal devices 104, 106, 108 into the measurement group. In block 202, the access node causes transmission of a broadcast message in the wireless network. The broadcast message comprises measurement group information specifying the selected subset of apparatuses. In block 204, the access node triggers reporting of measurements by causing transmission of a request-to-report message in the wireless network. In block 206, the access node acquires a plurality of measurement reports from the selected subset of apparatuses as a response to the transmitted request-to-report message.

Referring to FIG. 2A illustrating this procedure in the terminal device, the terminal device acquires a broadcast message from the access node in block 210. The broadcast message comprises measurement group information specifying a subset of apparatuses of a wireless network. The subset may comprise more than one apparatus of the wireless network, as described above. In block 212, the terminal device determines whether or not it has been specified in the measurement group information. In block 214, the terminal device acquires a request-to-report message from the access node. In response to determining that the terminal device is specified in the measurement group information in block 212 and acquiring the request-to-report message in block 214, the terminal device causes transmission of a measurement report to the access node in block 216.

The embodiment of FIGS. 2A and 2B configures the access node to select a measurement group and control the terminal devices belonging to the measurement group as a group. Accordingly, signalling overhead may be reduced in the sense that the access node does not have to control each terminal device individually. Additionally, not all the terminal devices need to be included in the measurement group which causes power savings in such terminal devices.

In an embodiment, the measurement group information comprises a measurement group identifier assigned to the measurement group and the request-to-report message comprises the same measurement group identifier.

Figure 3:
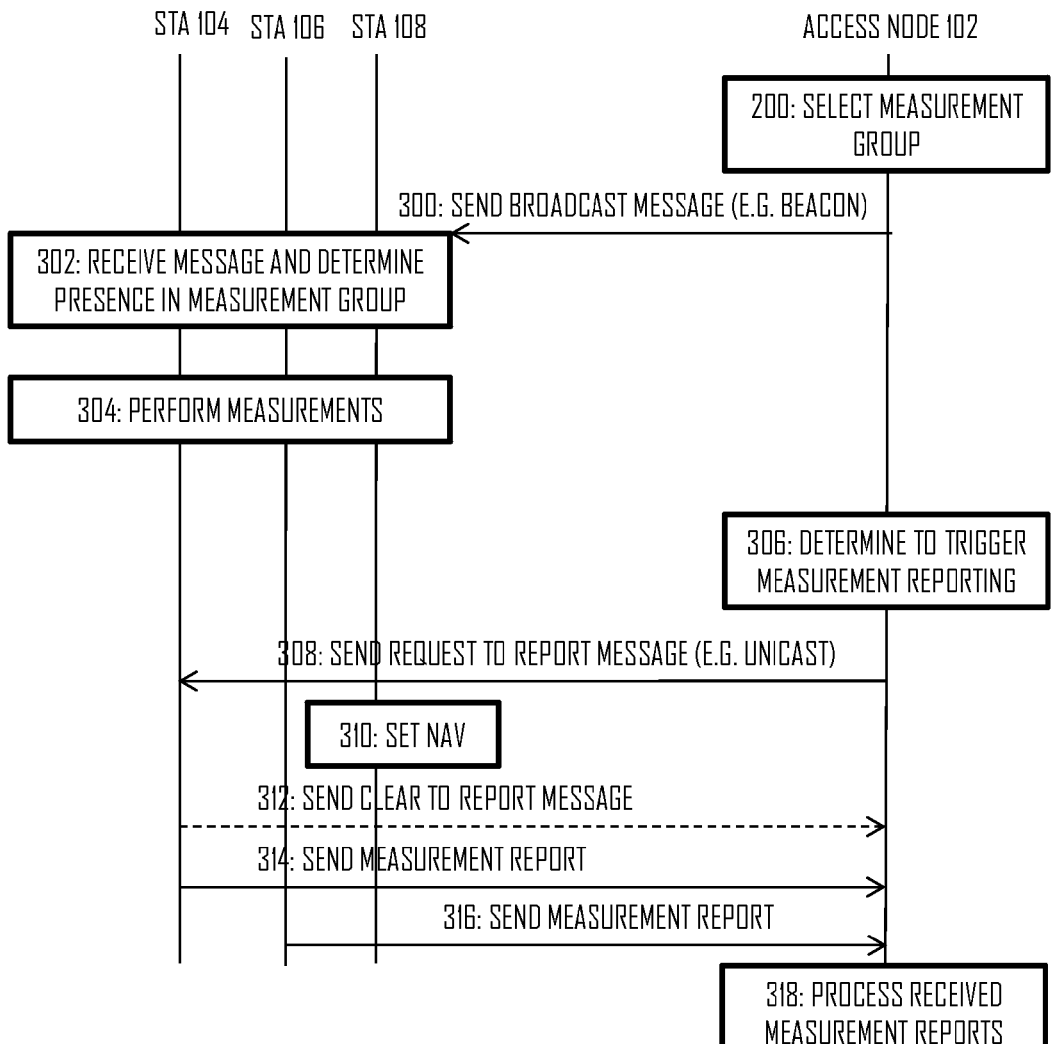
FIG. 3 illustrates a signalling diagram for assigning a measurement group and reporting measurements in a wireless network according to an embodiment of the invention.
Figure 6:
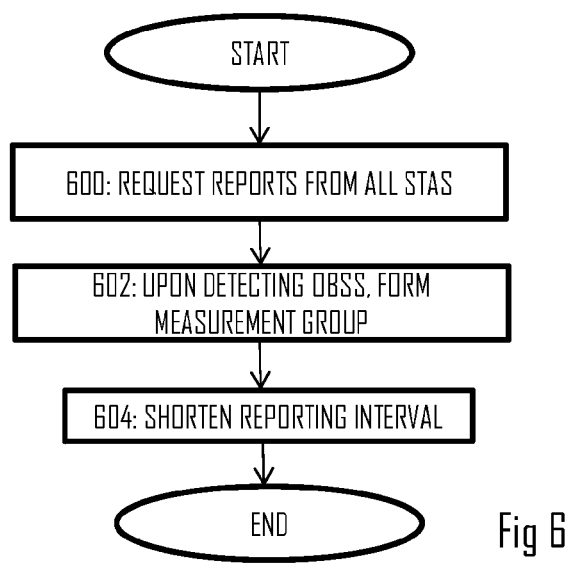
FIGS. 6 and 7 illustrate processes for selecting apparatuses to a measurement group according to some embodiments of the invention.

Let us now consider an embodiment of the procedure with reference to a signalling diagram of FIG. 3. FIG. 3 illustrates operation in the wireless network of the access node 102 of FIG. 1. Referring to Figure, the access node 102 carries out block 200 and selects the measurement group. FIG. 6 illustrates an embodiment of the selection procedure, and it is described below. Upon selecting the measurement group, the access node 102 may form an information element comprising the measurement group information. Table 1 illustrates an embodiment of the information element:

TABLE 1

| Element ID | Length | Group ID | Bitmap | Meas. Type |
|---|---|---|---|---|
| 2 octets | 2 octets | 1 octet | 1-251 octets | 1 octet |

An Element identifier (ID) field identifies the information element among other information elements employed in the wireless network, and a Length field specifies the length of the information element. A Group ID field may comprise the measurement group identifier assigned to the measurement group which is unique among measurement groups employed in the wireless network. A Bitmap field indicates the terminal devices selected to the measurement group. The bitmap may comprise a dedicated bit location for each terminal device of the wireless network, and a value of the bit location indicates whether or not the terminal device associated with that bit location has been selected to the measurement group. Accordingly, a terminal device may determine its bit location in the bitmap and check the bit value of its bit location. If the bit value indicates that the terminal device belongs to the measurement group, the terminal device may read the measurement group identifier and start to monitor frames or information elements addressed to the measurement group identifier.

Figure 5:
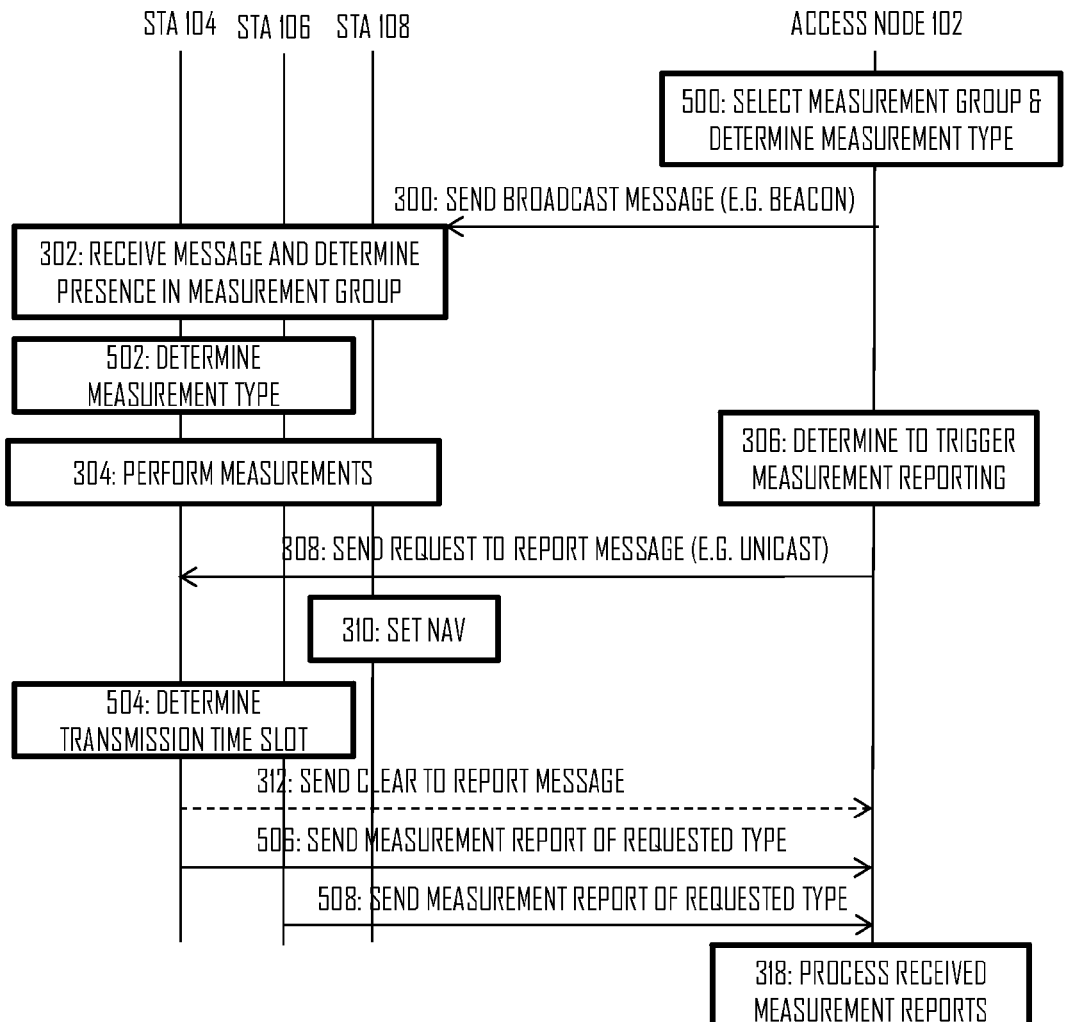
FIG. 5 illustrates a signalling diagram for assigning a measurement group and measurement type and reporting measurements in a wireless network according to an embodiment of the invention.

In an embodiment, the information element comprises a Measurement Type field that may specify one of a plurality of different types of measurements selected by the access node for the measurement group. FIG. 5 illustrates an embodiment for using the measurement type.

In step 300, the access node 102 sends the broadcast message comprising the information element of Table 1 in the wireless network. The broadcast message may be a beacon message, for example. Upon receiving the broadcast message, the terminal devices 104 to 108 read their respective bit locations in the bitmap field in block 302 and determine on the basis of respective bit values whether or not they are assigned to the measurement group. Let us assume that the terminal devices 104 and 106 have been assigned and terminal device 108 has not been assigned to the measurement group. As a consequence, the terminal devices 104 and 106 register themselves internally to the measurement group and store the group ID. In block 304, the terminal device may carry out channel measurements as conventional process of their operation. Even the terminal devices not belonging to the measurement group may carry out the measurements in order to detect neighbouring networks and estimate channel properties.

In block 306, the access node may trigger the reporting of the measurement results. Block 306 may be executed periodically and/or upon detecting a determined event. As a consequence, the access node 102 sends the request-to-report message to at least one terminal device of the measurement group in step 308. In an embodiment, the request-to-report message is transmitted as a unicast message addressed to a unicast address of one of the terminal devices of the measurement group, e.g. the terminal device 104 in this example. In another embodiment, the request-to-report message may be transmitted as a groupcast message to a groupcast address. The groupcast address may be at least one of a broadcast address and a multicast address. The request-to-report message may be a request-to-report control frame comprising information elements illustrated in Table 2:

TABLE 2

| Frame Control | Duration | RA | TA | BSSID | Group ID | RTR Options | FCS |
|---|---|---|---|---|---|---|---|
| 2 oct | 2 oct | 6 oct | 6 oct | 6 oct | 1 oct | 1 oct | 4 oct |

A Frame Control field may contain control information defining the type of the frame. A Duration field may specify a time period reserved for transmitting the measurement reports. The request-to-report may thus be understood as a channel reservation message reserving the channel for the transmission of the measurement reports. A Receiver Address (RA) field specifies a recipient of the request-to-report message, and a Transmitter Address (TA) specifies the transmitter of the request-to-report message (the access node 102). The addresses may be medium access control (MAC) addresses. A BSS identifier comprises a network identifier of the wireless network of the access node. The Group ID identifies the measurement group that is requested to send the measurement reports. A request-to-report (RTR) Options field comprises parameters for use in the transmission of the measurement report. The RTR Options field may have a following structure:

TABLE 3

| MCS | Number of Reported Apparatuses | Reserved |
|---|---|---|
| 3 bits | 3 bits | 2 bits |

The modulation and coding scheme (MCS) indicates a modulation and coding scheme to be used in the transmission of the measurement report. The number of reported apparatuses specifies the number of detected wireless apparatuses to be reported in a single measurement report.

A Frame Check Sequence (FCS) may be used for error detection as a part of a cyclic redundancy check (CSC), for example.

Upon receiving the request-to-report message, the terminal devices 104 to 108 may operate in a different manner depending on whether or not they belong to the measurement group indicated in the request-to-report message. The terminal device 108 not belonging to the measurement group may be configured, upon receiving the request-to-report message and determining that it does not belong to the measurement group requested to send the measurement reports, to prevent any frame transmissions in the wireless network for the duration specified in the Duration field (block 310). In the context of 802.11 networks, the terminal device 108 may start a network allocation vector (NAV) setting that prevents a frame transmission for the specified duration. Accordingly, the terminal device 108 frees the channel for the transmission of the measurement reports.

The terminal device to which the request-to-report message was addressed may be configured to send a clear-to-report message as a response in step 312. The clear-to-report message may be a clear-to-report frame having substantially similar structure as the request-to-report frame illustrated in Table 2. The exception may be that the transmitter address and the receiver address have been switched, e.g. the terminal device 104 may insert its own address as the transmitter address and the address of the access node 102 may be inserted into the receiver address field. Another distinguishing feature may be that a header or the frame control part may identify the clear-to-report frame such that it distinguishes from the request-to-report frame. Otherwise, the clear-to-report frame may be a copy of the request-to-report frame. The clear-to-report message may be considered as a second announcement of the measurement reporting to be carried out and it may be used to extend the effective coverage area of the announcement. Referring to FIG. 1, the terminal device 109 may not be able to receive the request-to-report message from the access node but it may be able to receive the clear-to-report message from the terminal device 104.

Upon transmitting the clear-to-report message or, in some embodiments, after the reception of at least one of the request-to-report message and the clear-to-report transmitted by another terminal in the measurement group, the terminal devices belonging to the measurement group may be configured to send the measurement reports in steps 314 and 316. The measurement reports may be transmitted by using channel contention amongst the reporting devices or, in some embodiments, the access node may configure contention-free transmission (see embodiment of FIG. 5) for the measurement reports. Upon receiving the measurement reports, the access node may process the measurement reports in block 318 and carry out reconfigurations on the basis of the contents of the measurement reports. For example, if the measurement reports show that one or more other wireless networks are detected on the same channel and causing interference, the access node may be configured to switch a channel of the wireless network, reduce operating channels or bandwidth of the wireless network, contact an access node of the other wireless networks and negotiate about the coexistence, etc.

In an embodiment, the access node may form a plurality of measurement groups. The access node may select a given terminal device to be included in a plurality of measurement groups. The procedure may in this respect be similar to that described above and below for a single measurement group. A terminal device belonging to one measurement group may in block 302 determine that it has been assigned to another measurement group. In another embodiment, the access node may select a plurality of measurement groups in block 200 and indicate the members of the plurality of measurement groups in the same broadcast message in block 300. The broadcast message may then comprise a plurality of information elements of Table 1. The reporting may be triggered in blocks 306 and 308 individually for each measurement group.

In another embodiment, the request-to-report message is a broadcast message indicating that the channel is free for transmission of the measurement reports, e.g. a clear-to-send message of 802.11 networks. The broadcast message may be a null data packet.

Figure 4:
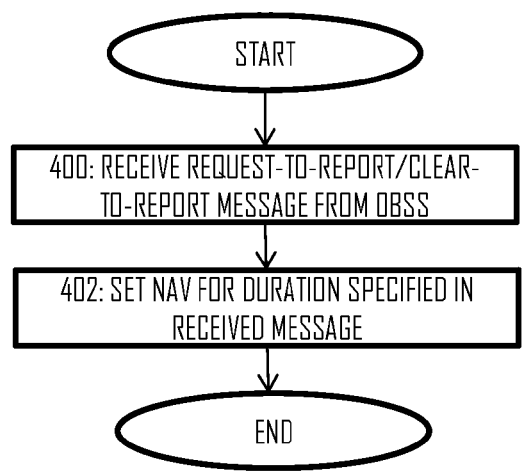
FIG. 4 illustrates a flow diagram of a process for preventing frame transmissions for the duration of measurement reporting according to an embodiment of the invention.

FIG. 4 illustrates operation in an access node 100 or a terminal device 109 (a wireless apparatus as a generalization) upon receiving the request-to-report or a clear-to-report message from another wireless network. Referring to FIG. 4, the wireless apparatus receives the request-to-report message or the clear-to-report message from the other wireless network. Upon detecting that the BSSID or a corresponding network identifier indicates that the message comes from another wireless network and upon detecting that the message is an announcement of triggered measurement reporting, the wireless apparatus prevents in block 402 transmission of any frames in its wireless network for the duration specified in the message received in block 400. As a consequence, the NAV functionality may be expanded to overlapping wireless networks operating on the same channel, thus reducing inter-system interference for the duration of the measurement reporting. This reduces the number of collisions during the measurement reporting.

With respect to performing the measurements in block 304, the terminal devices may carry out the measurements in arbitrary occasions, e.g. on their own volition. As a consequence, block 304 may equally be carried out before block 302 or both before and after block 302. In another embodiment, the measurement reports may serve also as measurement frames and the request-to-report message and/or the clear-to-report message may be used as an indicator of a measurement period in addition to the measurement report period. Any terminal device 104 to 109 carrying out any measurements may trigger the measurements upon receiving the request-to-report message and/or the clear-to-report message and carry out measurements upon receiving the measurement report messages. The terminal devices 104 to 109 may thus detect neighbouring wireless networks and their wireless apparatuses and/or they may sense channel conditions/qualities towards the transmitters of the measurement reports. From the viewpoint of terminal device 109, the terminal device 109 may then carry out measurements directed towards the neighbouring wireless network.

The measurement report may comprise for each reported wireless apparatus an identifier of the apparatus, an identifier of a wireless network of the apparatus, and a received signal strength indicator (RSSI) indicating channel quality between the reporting apparatus and the reported apparatus. An example of the measurement report is a Radio Measurement Frame Report frame of 802.11 networks.

FIG. 5 illustrates an embodiment of FIG. 3 where the access node 102 and the terminal devices 104 to 108 support the procedure of FIG. 3 for a plurality of different types of measurements. The embodiment of FIG. 5 further provides contention-free transmission for the measurement reports. These two embodiments of FIG. 5 are not dependent on one another and some modified embodiments of FIG. 5 exclude either the provision of the multiple measurement types or the contention-free transmission of the measurement reports. Referring to FIG. 5, the access node 102 selects the measurement group in block 500 and, additionally, selects a measurement type to be carried out by the selected measurement group. Different types of measurements may comprise at least one of the following: measurements directed to neighbouring wireless networks (OBSS), measurements within the wireless network of the access node, interference measurements, channel/network congestion measurements.

Upon selecting the measurement group and the measurement type, the access node 102 may form a broadcast message comprising the information element of Table 1 (step 300). Upon receiving the broadcast message, each terminal device 104 to 108 extracts the measurement group information in order to determine whether or not it is assigned to the measurement group (block 302). Upon determining that they have been assigned to the measurement group, the terminal devices 104, 106 may analyse the Measurement Type field in order to determine what type of measurements the access node 102 expects from the measurement group.

Upon determining to trigger the measurement reporting in block 306, the access node transmits the request-to-report message in step 308, as described above. The request-to-report message may comprise the information element of Table 2. As the terminal device 108 does not belong to the measurement group, it may set the NAV for the duration specified in the request-to-report message (block 310). As the terminal device 109 does not belong to the wireless network of the access node 102, it may set the NAV for the duration specified in the request-to-report message, e.g. it may also carry out block 310 in response to the reception of the request-to-report message in step 308.

Upon receiving the request-to-report message, the terminal devices 104, 106 belonging to the measurement group may determine from the Group ID field that the request-to-report message is addressed to their measurement group. Then, the terminal devices 104, 106 may extract the RTR Options field and determine the MCS and the number of reported apparatuses. Contents of these fields may enable the terminal devices 104, 106 to compute duration of a single measurement report, e.g. according to the following equation (1):

$$T_{Meas\ Report} = \{[(S_{Frame\ Count\ element} * N_{Apparatuses\ to\ Report}) + S_{Frame\ Report\ frame}] / R_{MCS}\} * T_{OFDM\ Symbol} \quad (1)$$

where $T_{Meas\ Report}$ represents the duration if the measurement report, e.g. in microseconds (μs), $S_{Frame\ Count\ element}$ represents the size (in bits) of a single report element of a single reported apparatus, $N_{Apparatuses\ to\ Report}$ represents the number of apparatuses to report informed in the RTR Options field of the request-to-report message, $S_{Frame\ Report\ frame}$ represents the size of the other (fixed) fields comprised in the measurement report, $R_{MCS}$ represents the data rate (in bits per µs) for the specified MCS index indicated in the request-to-report message, and $T_{OFDM\ Symbol}$ represents a symbol duration (in µs). The symbol may be an orthogonal frequency division multiplexing symbol or another symbol.

The duration of the measurement report may be computed in block 504. The terminal devices 104, 106 may further determine a transmission order in block 504, or a terminal device 104, 106 may at least determine its transmission turn. The transmission turn may be computed from bitmap of the measurement group information of Table 1. The terminal device 104, 106 may determine the terminal devices included in the measurement group from the bit values of the bitmap. The terminal device 104, 106 may then sort the terminal devices included in the group into the same order as they appear in the bitmap. As a consequence, the terminal device 104, 106 may acquire the transmission order of the terminal devices when transmitting the measurement reports. The terminal device 104, 106 may then determine its transmission turn by retrieving its relative position in the sorted list of the measurement group. The actual transmission time slot allocated to the terminal device 104, 106 may then set a timer upon receiving the request-to-report message and compute its transmission time slot $T_{Start}$ according to the following Equation (2):

$$T_{start} = T_{CTR} + SIFS + [(P-1)*(T_{Meas\ Report} + SIFS)] \quad (2)$$

where $T_{CTR}$ is the time duration of the clear-to-report (CTR) message (in µs), SIFS represents a short inter-frame space of 802.11 networks or a corresponding guard interval after the transmission of each frame (in µs), and P represents the location of the terminal device in the transmission order. In embodiments not using the CTR message, $T_{CTR}$ may be omitted.

As each terminal device has thus been scheduled with a transmission time slot, the transmission of the measurement reports may be carried out in a contention-free manner. Accordingly, the terminal devices 104, 106 may omit any conventional channel contention measures such as clear-channel assessment, backoff calculation, or other collision avoidance measures used in 802.11 networks, for example. Accordingly, the transmission of the measurement reports may be carried out reliably and rapidly.

In 506 and 508, the terminal devices 104, 106 form and transmit the measurement reports comprising measurement results acquired on the basis of carrying out the measurements of the measurement type requested in the broadcast message received in block 302. Upon receiving the measurement reports, the access node may process the received measurement reports in block 318.

FIG. 6 illustrates a flow diagram of an embodiment where the access node 102 selects the measurement group upon detecting a neighboring wireless network. Referring to FIG. 6, an initial situation may be such that the access node 102 requests for measurement reports from all terminal devices 104, 106, 108 of the wireless network. The access node 102 may send a measurement request to the terminal devices in a broadcast message such as a beacon (block 600). The measurement request may configure the terminal devices to carry out measurement of a requested type, e.g. neighbor network measurements. In an embodiment, the measurement request comprises a neighbor network scanning request as an information element. Table 4 illustrates an embodiment of the information element:

TABLE 4

| Duration | Options | Bitmap (optional) |
|---|---|---|
| 1 octet | 1 octet | variable |

Duration field may specify a reporting interval, e.g. a time interval between two consecutive measurement reports. Options field may have the following structure:

TABLE 5

| STA/AP | All STA | Bitmap Present | Reserved |
|---|---|---|---|
| 1 bit | 1 bit | 1 bit | 5 bits |

One value of a STA/AP bit may indicate that the terminal devices are requested to scan for both access nodes and terminal devices of the neighbor networks. The other value may indicate that the terminal devices are requested to scan for only the access nodes of the neighbor networks. An all STA bit may be used to indicate whether or not all terminal devices of the wireless network are requested to perform the measurements. A Bitmap Present sub-field may indicate whether or not a bitmap similar to that of Table 1 is present. If all the terminal devices are requested to perform the measurements, the bitmap may be omitted. If a subset of terminal devices is requested to perform the measurements, the bitmap may be included, and the bitmap may indicate the terminal devices that are requested to perform the measurements, as described above in connection with Table 1.

After the duration set in the scanning request has expired from the transmission of the scanning request, the access node may set a restricted access window with transmission time slots assigned to each terminal device of the measurement group requested to perform the measurements. The terminal devices of the measurement may then carry out channel contention in a situation where a reduced set of terminal devices of the wireless network are allowed to try the channel access, namely the measurement group. Upon gaining channel access within the restricted access window, the terminal devices may then send the measurement reports to the access node.

As described above, the access node may first request all the terminal devices to perform the scanning in block 600. Upon detecting that at least one terminal device reports detection of a neighboring network, the access node may carry out block 602 in which it selects the measurement group. The measurement group may be selected to comprise terminal devices that reported the detection of the neighbor network, and the access node may exclude from the measurement group at least one terminal device that did not report detection of the neighbor network. The access node may further determine a new reporting interval (block 604) which may be shorter than the duration specified in the Duration field transmitted in block 600. Accordingly, the terminal devices of the new measurement group will send measurement reports more rapidly. Upon selecting the measurement group and the reporting interval, the access node may send a new neighbor network scanning request indicating the selected measurement group. In this manner, the access node may reconfigure the measurement group on the basis of which terminal devices detect and report the presence of the neighbor network. When none of the terminal devices of the measurement group detect the neighbor network(s), the process may return to block 600, and the access node may revert to using all terminal devices and the longer reporting interval.

Figure 7:
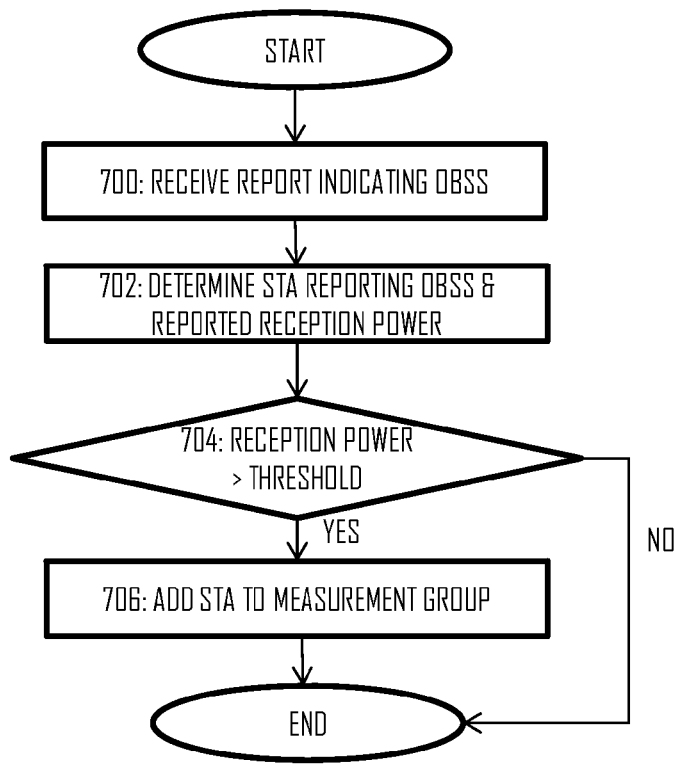

With respect to selection process in blocks 200, 500, and 602 in connection with neighbor network scanning, let us describe a process illustrated in FIG. 7. Upon receiving a measurement report from a terminal device reporting detection of a neighbor network (block 700 or 602), the access node may determine the terminal device that reported the detection and an RSSI reported by the terminal device for the detected neighbor network (block 702). If the reported RSSI is higher than a determined threshold in block 704, the access node may determine that the terminal device is sufficiently close to the neighbor network and include the terminal device in the measurement group (block 706). Otherwise, the terminal device may be omitted from the measurement group and the access node may proceed to processing the next measurement report.

Figure 8:
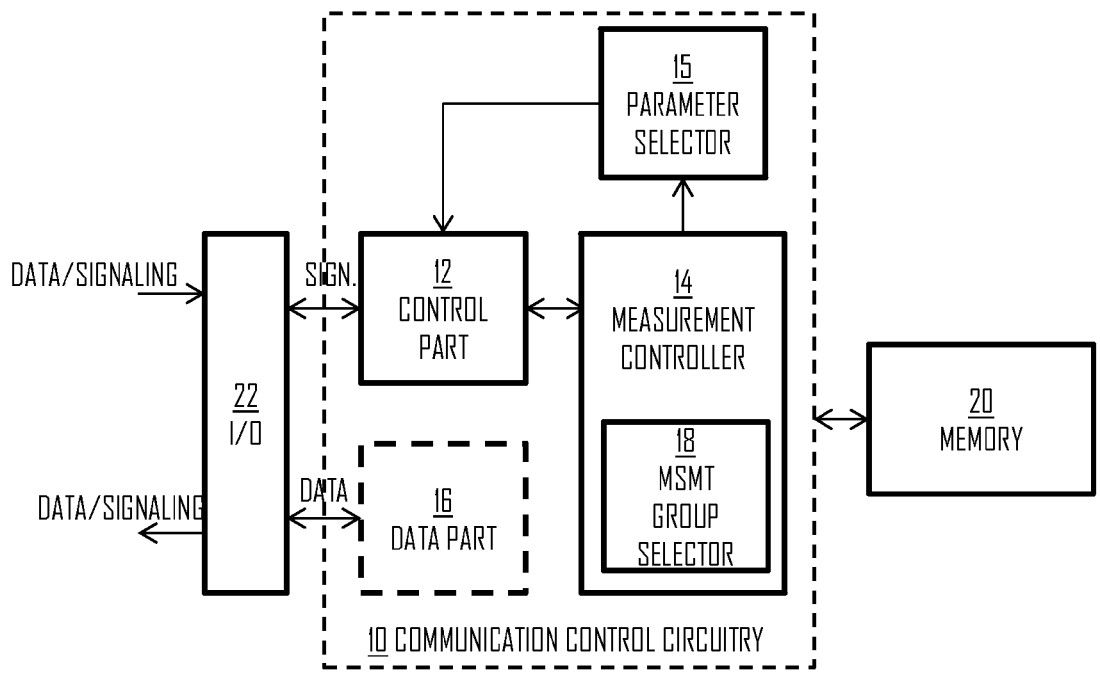
FIGS. 8 and 9 illustrate block diagrams of apparatuses according to some embodiments of the invention.

FIG. 8 illustrates an embodiment of an apparatus comprising means for carrying out the above-mentioned functionalities of the access node. The access node may be a wireless apparatus which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the serving apparatus is comprised in such a wireless apparatus, e.g. the apparatus may comprise a circuitry, e.g. a chip, a processor, a micro controller, or a combination of such circuitries in the wireless apparatus.

Referring to FIG. 8, the apparatus may comprise a communication controller circuitry 10 configured to control wireless communications in the access node. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including the beacon messages, request-to-report messages, measurement reports, etc. The communication controller circuitry 10 may further comprise a data part 16 that handles transmission and reception of payload data when the access node is associated to one or more other wireless apparatuses.

The communication control circuitry 10 may further comprise a measurement controller 14 configured to control measurements carried out in a wireless network of the access node. The measurement controller 14 may configure the terminal devices of the wireless network to perform measurements, as described above. The measurement controller 14 may comprise a measurement group selector circuitry 18 configured to select measurement groups according to determined criteria. The measurement controller 14 may employ one or more measurement groups in the wireless networks, wherein different measurement groups may comprise the same or different terminal devices. The measurement controller 14 may further trigger the reporting intervals in the above-described manner and collect the measurement reports received through the control part 12. The measurement controller 14 may extract the contents of the measurement reports and output the measurement results to a parameter selector circuitry 15 configured to adjust operational parameters of the access node and/or the wireless network according to the received measurement results. The parameters selector circuitry 15 may reconfigure operational parameters of at least the control part 12 on the basis of the measurement results.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the access node. The memory 20 may also store communication parameters and other information needed for the wireless communications, e.g. currently active measurement groups and measurement results. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the access node comprises at least one processor and at least one memory including a computer program code, wherein the at least one memory and the computer program code are configured, with the at least one processor, to cause the apparatus to carry out the functionalities of the access node according to any one of the embodiments of FIGS. 2A and 3 to 7. Accordingly, the at least one processor, the memory, and the computer program code form processing means for carrying out embodiments of the present invention in the access node or, in general, a wireless apparatus.

Figure 9:
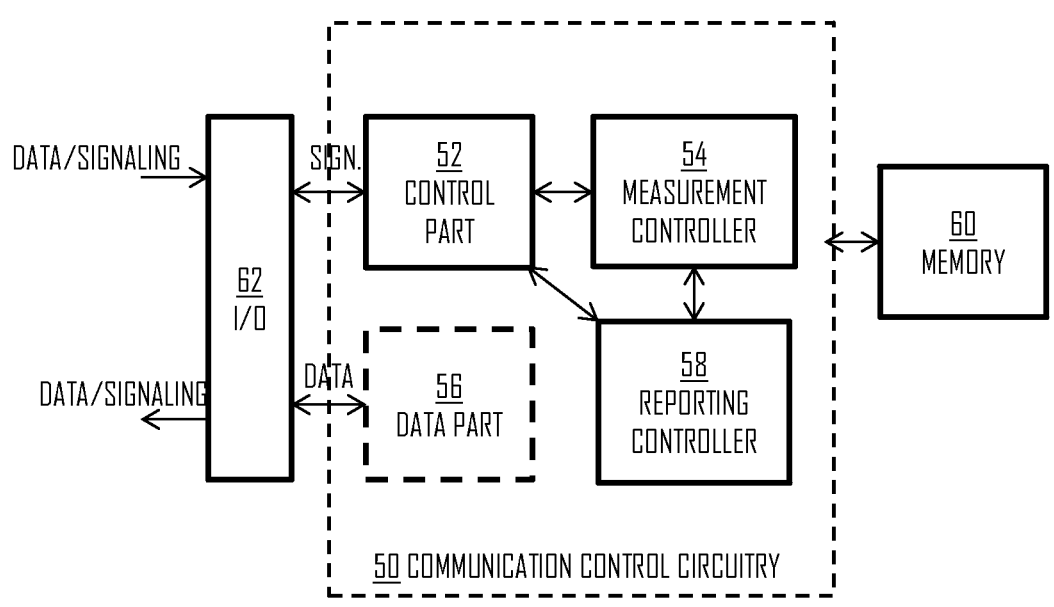

FIG. 9 illustrates an embodiment of an apparatus comprising means for carrying out the above-mentioned functionalities of the terminal device. The terminal device may comply with specifications of an IEEE 802.11 network and/or another wireless network. The terminal device may also be a cognitive radio apparatus capable of adapting its operation to a changing radio environment, e.g. to changes in parameters of another system on the same frequency band. The terminal device may be or may be comprised in a computer (PC), a laptop, a tablet computer, a cellular phone, a palm computer, or any other wireless apparatus provided with radio communication capability. In another embodiment, the apparatus carrying out the above-described functionalities of the terminal device is comprised in such a wireless apparatus, e.g. the apparatus may comprise a circuitry, e.g. a chip, a processor, a micro controller, or a combination of such circuitries in the wireless apparatus.

Referring to FIG. 9, the apparatus may comprise a communication controller circuitry 50 configured to control wireless communications in the client apparatus. The communication controller circuitry 50 may comprise a control part 52 handling control signalling communication with respect to transmission, reception, and extraction of control or management frames including the broadcast messages, request-to-report messages, clear-to-report messages, and measurement reports, as described above. The control part 52 may further carry out scanning in order to detect and measure any broadcast, beacon, or other frames received from a wireless network of the terminal device or from other wireless networks. The communication controller circuitry 50 may further comprise a data part 56 that handles transmission and reception of payload data with other wireless apparatuses associated to the apparatus, e.g. the access node.

The communication controller circuitry 50 may further comprise a measurement controller 54 configured to carry out radio measurements in the apparatus according to instructions received from the access node through the control part 52. The measurement controller may be configured to determine the measurement groups to which the apparatus has been assigned, measurement type assigned to the group(s) where the apparatus belongs, etc. The measurement controller 54 may then control the control part 54 to operate radio circuitries to carry out the measurements accordingly. Upon receiving measurement signals from the control part 52, the measurement controller may process the measurement signals and compute measurement results to be included in measurement reports transmitted to the access node.

The communication controller circuitry 50 may further comprise a reporting controller 58 configured to carry out reporting of the measurement results to the access node according to the instructions received from the access node through the control part 52. For example, upon receiving a request-to-report message from the access node, the reporting controller may gather any measurement results that have been requested by the access node and prepare a measurement report comprising the measurement results. The reporting controller may further determine a transmission time slot for transmitting the measurement report, e.g. by using channel contention in which case the reporting controller may simply output the measurement report to the control part 52 for transmission, or by determining a contention-free transmission time slot in which case the reporting controller 58 may input the determined transmission time slot to the control part 58 such that the control part 58 may carry out the transmission of the measurement report in the determined transmission time slot.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise a memory 60 that stores computer programs (software) configuring the apparatus to perform the above-described functionalities of the wireless apparatus, e.g. the terminal device. The memory 60 may also store communication parameters and other information needed for the wireless communications within a wireless network of the terminal device. The apparatus may further comprise an input/output circuitry 62. The input/output circuitry 62 may comprise radio interface components providing the apparatus with radio communication capabilities within its wireless network and/or with other wireless networks. The radio interface components may comprise standard well-known components such as an amplifier, filter, frequency-converter, (de)modulator, and encoder/decoder circuitries and one or more antennas. The apparatus may further comprise a user interface enabling interaction with the user of the device. The user interface may comprise a display, a keypad or a keyboard, a loudspeaker, etc.

In an embodiment, the apparatus carrying out the embodiments of the invention in the terminal device comprises at least one processor and at least one memory including a computer program code, wherein the at least one memory and the computer program code are configured, with the at least one processor, to cause the apparatus to carry out the functionalities of the terminal device according to any one of the processes described above with respect to FIGS. 2B and 3 to 5. Accordingly, the at least one processor, the memory, and the computer program code form processing means for carrying out embodiments of the present invention in the terminal device.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2A to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless systems defined above but also to other suitable wireless communication systems. The protocols used, the specifications of the wireless communication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    acquiring, in a first apparatus, a broadcast message from a second apparatus, the broadcast message comprising measurement group information specifying a subset of apparatuses of a wireless network, the subset comprising more than one apparatus and forming a measurement group;

determining, by the first apparatus, whether or not the first apparatus is specified in the measurement group information;

acquiring, in the first apparatus, a request-to-report message from the second apparatus; and in response to determining that the first apparatus is specified in the measurement group information and said acquiring the request-to-report message, causing transmission of a measurement report to the second apparatus.

2. The method of claim 1, wherein the broadcast message comprises an information element specifying a measurement type for the measurement group.

3. The method of claim 2, wherein the measurement type comprises measurements of signals received from another wireless network.

4. The method of claim 1, wherein the measurement group information comprises a measurement group identifier assigned to the measurement group and the request-to-report message comprises the measurement group identifier.

5. The method of claim 1, wherein the broadcast message comprises at least second measurement group information specifying a second subset of apparatuses of a wireless network forming a second measurement group;

further comprising in the first apparatus: determining that the first apparatus is specified in at least two measurement group information.

6. An apparatus comprising:

at least one processor; and at least one memory including a computer program code, wherein the at least one memory and the computer program code are configured, with the at least one processor, to cause the apparatus to:

acquire a broadcast message from a second apparatus, the broadcast message comprising measurement group information specifying a subset of apparatuses of a wireless network, the subset comprising more than one apparatus and forming a measurement group;

determine whether or not the apparatus is specified in the measurement group information;

acquire a request-to-report message from the second apparatus; and in response to determining that the apparatus is specified in the measurement group information and said acquiring the request-to-report message, cause transmission of a measurement report to the second apparatus.

7. The apparatus of claim 6, wherein the broadcast message comprises an information element specifying a measurement type for the measurement group.

8. The apparatus of claim 7, wherein the measurement type comprises measurements of signals received from another wireless network.

9. The apparatus of claim 6, wherein the measurement group information comprises a measurement group identifier assigned to the measurement group and the request-to-report message comprises the measurement group identifier.

10. The apparatus of claim 6, wherein the broadcast message comprises at least second measurement group information specifying a second subset of apparatuses of a wireless network forming a second measurement group.

11. The apparatus of claim 6, wherein the at least one memory and the computer program code are configured, with the at least one processor, to cause the apparatus to determine that the apparatus is specified in at least two measurement group information.

12. The apparatus of claim 6, wherein the request-to-report message comprises scheduling information scheduling transmission time slots to the subset of apparatuses specified by the measurement group information, and wherein the at least one memory and the computer program code are configured, with the at least one processor, to cause the apparatus to:

in response to said determining that the apparatus is specified in the measurement group information and said acquiring the request-to-report message, determine a time slot scheduled to the apparatus from the scheduling information comprised in the acquired request-to-report message and cause the transmission of the measurement report in the determined time slot.

* * * * *